(12) United States Patent
Langford (10) Patent No.: US 12,437,237 B2
(45) Date of Patent: Oct. 7, 2025

(54) SEQUENTIAL SYNTHESIS AND SELECTION FOR FEATURE ENGINEERING

(71) Applicant: Capital One Services, LLC, McLean, VA (US)

(72) Inventor: Michael Langford, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 730 days.

(21) Appl. No.: 17/859,978

(22) Filed: Jul. 7, 2022

(65) Prior Publication Data

US 2024/0013089 A1  Jan. 11, 2024

(51) Int. Cl.
*G06F 18/211* (2023.01)
*G06F 18/214* (2023.01)
*G06N 20/00* (2019.01)

(52) U.S. Cl.
CPC .......... *G06N 20/00* (2019.01); *G06F 18/211* (2023.01); *G06F 18/2155* (2023.01)

(58) Field of Classification Search
CPC .... G06F 18/211; G06F 18/2155; G06N 20/00
See application file for complete search history.

(56) References Cited

U.S. PATENT DOCUMENTS

| 12,306,909 | B1* | 5/2025 | Matar | G06F 18/2163 |
| 2010/0257501 | A1* | 10/2010 | Ouali | G06F 30/39 |
| | | | | 716/119 |
| 2017/0017900 | A1* | 1/2017 | Maor | G06F 16/2456 |
| 2019/0318248 | A1* | 10/2019 | Moreira-Matias | G06N 20/20 |
| 2020/0311611 | A1* | 10/2020 | Kennedy | G06N 20/20 |
| 2021/0133630 | A1* | 5/2021 | Dalli | G06N 5/045 |
| 2022/0091818 | A1* | 3/2022 | Gu | G06F 18/217 |

* cited by examiner

*Primary Examiner* — Beau D Spratt
(74) *Attorney, Agent, or Firm* — Banner & Witcoff, Ltd.

(57) ABSTRACT

Systems and methods, as described herein, relate to sequential synthesis and selection for feature engineering. A dataset may be associated with a label defining a machine-learning target attribute and a received operation that can be applied to at least one of the existing features of the dataset. One or more potential features may be generated by applying the operation to one or more existing features. For each of the one or more potential features, a feature importance algorithm may be applied to the respective feature along with the one or more existing features, generating a respective feature importance value. Respective feature importance values may be generated for each of the one or more existing features based on applying the feature importance algorithm and used to sort the potential features. A level of correlation to each of the one or more existing features may be determined to make sure it is under a threshold level to avoid new features heavily correlated to existing ones.

17 Claims, 6 Drawing Sheets

SEQUENTIAL SYNTHESIS AND SELECTION FOR FEATURE ENGINEERING

FIELD OF USE

Aspects of the disclosure generally relate to machine learning and the managing thereof and more specifically to feature selection for machine learning models.

BACKGROUND

Machine learning evolved from the study of pattern recognition and computational learning theory in artificial intelligence. Machine learning explores the study and construction of algorithms that can learn from and make predictions on data. Such algorithms operate by building a machine-implemented model from example inputs in order to make data-driven predictions or decisions rather than following strictly static program instructions.

In machine learning, features are individual measurable properties or characteristics that may act like an input of the machine model. The features are used to make predictions and are used to train the machine learning models. It would be useful to have a way to generate features that can discover hidden features that are useful for the machine learning model.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Machine learning models may be made more accurate and robust by constructing new features from the datasets being utilized. In some cases, new features may be built off of existing features. Building new features from existing ones subjectively may require deep domain knowledge that may not be possessed by a person attempting to build the new features. Programmed computer devices providing a way to search for and build informative features using an existing dataset may be very useful to train robust machine learning models while lowering the barrier to build useful features for less experienced data analysts. Aspects described herein may address these and other problems, and generally improve the quality, efficiency, and efficacy of machine learning models.

A computer-implemented method may execute on a computing device and comprise receiving a dataset with one or more existing features. The received dataset may be associated with a dataset label defining a machine-learning target attribute. The method may further comprise receiving an operation that can be applied to at least one of the one or more existing features of the dataset. The method may further comprise generating one or more potential features by applying the operation to the at least one of the one or more existing features. For each of the one or more potential features, the method may comprise: applying a feature importance algorithm to the respective feature along with the one or more existing features, generating a respective feature importance value for the respective feature based on applying the feature importance algorithm, and generating respective feature importance values for each of the one or more existing features based on applying the feature importance algorithm. The method may further comprise sorting the generated one or more potential features by their respective feature importance values. The method may further comprise receiving a threshold level of correlation. The method may further comprise, starting with a first feature of the sorted, generated one or more potential features, determining a level of correlation to each of the one or more existing features. The method may further comprise determining each determined level of correlation to each of the one or more existing features of the first feature is under the threshold level of correlation. The method may further comprise adding the first feature of the sorted, generated one or more potential features to the dataset as a new feature of the one or more existing features based on determining each determined level of correlation to each of the one or more existing features is under the threshold level of correlation.

In some implementations, the method may further comprise determining a level of correlation to each of the one or more existing features of a second feature of the sorted, generated one or more potential features. The method may further comprise determining the one of the level of correlation to each of the one or more existing features of the second feature of the sorted, generated one or more potential features is at or over the threshold level of correlation. The method may further comprise skipping adding the second feature of the sorted, generated one or more potential features to the dataset based on determining the one of the level of correlation to each of the one or more existing features of the second feature of the sorted, generated one or more potential features is at or over the threshold level of correlation.

In some implementations, the method may further comprise, for each of the one or more potential features, a plurality of respective feature importance values for the respective feature are obtained based on applying the feature importance algorithm a plurality of times, a plurality of respective feature importance values for each of the one or more existing features are obtained based on applying the feature importance algorithm the plurality of times, the respective feature importance value for the respective feature is obtained by averaging the plurality of respective feature importance values for the respective feature, and the respective feature importance values for the one or more existing features is obtained by averaging the plurality of respective feature importance values for each respective one or more existing features.

In some implementations, the method may further comprise updating the respective feature importance value for the respective feature based on applying the feature importance algorithm by summing the respective feature importance values for the one or more existing features and dividing by the respective feature importance value. In some implementations, the added first feature of the dataset is used as an input to a machine-learning model.

In some implementations, the method may further comprise receiving a number of runs to perform. The method may further comprise, for each of the one or more potential features: the number of runs to perform of respective feature importance values for the respective feature are obtained based on applying the feature importance algorithm the number of runs to perform times, the number of runs to perform of respective feature importance values for each of the one or more existing features are obtained based on applying the feature importance algorithm the number of runs to perform times, the respective feature importance value for the respective feature is obtained by averaging the number of runs to perform of respective feature importance values for the respective feature, and the respective feature importance values for the one or more existing features is obtained by averaging the number of runs to perform of respective feature importance values for each respective one or more existing features.

In some implementations, the method may further comprise receiving a total number of new features to add. The method may further comprise iterating through the sorted, generated one or more potential features until the total number of new features are added or until no more potential features are left by: determining the level of correlation to each of the one or more existing features of the respective one or more potential feature, determining each determined level of correlation to each of the one or more existing features of the respective one or more potential feature is under the threshold level of correlation, and adding the respective one or more potential feature of the sorted, generated one or more potential features to the dataset as a respective new feature of the one or more existing features based on determining each determined level of correlation to each of the one or more existing features is under the threshold level of correlation. The method may further comprise determining a number of new features added consequent to iterating through the sorted, generated one or more potential features is less than the total number of new features to add and sending an alert based on determining the number of new features added consequent to iterating through the sorted, generated one or more potential features is less than the total number of new features to add.

In some implementations, computing system(s) may comprise one or more processors and memory storing instructions that, when executed by the one or more processors, cause the computing system(s) to execute the steps of any of the methods described above.

In some implementations, a non-transitory computer-readable storage medium may comprise instructions. The instructions, when executed, may cause computing system(s) to execute the steps of any of the methods described above.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Without good domain knowledge of the data encompassed by a dataset, finding the best new features can be very difficult. Finding hidden features may require a lot of domain knowledge that may not be possessed by the user. Systems and methods for making accurate and robust machine learning models are obtained by leveraging the systems and methods to construct new features from the datasets being utilized. In addition, programmed computer devices may be used to search for and build informative features using an existing dataset. Features may be built sequentially using a user's structured dataset. The features that are most informative for a task to be completed (e.g., a classification task, a regression task, or the like), may be thus generated.

Figure 1:
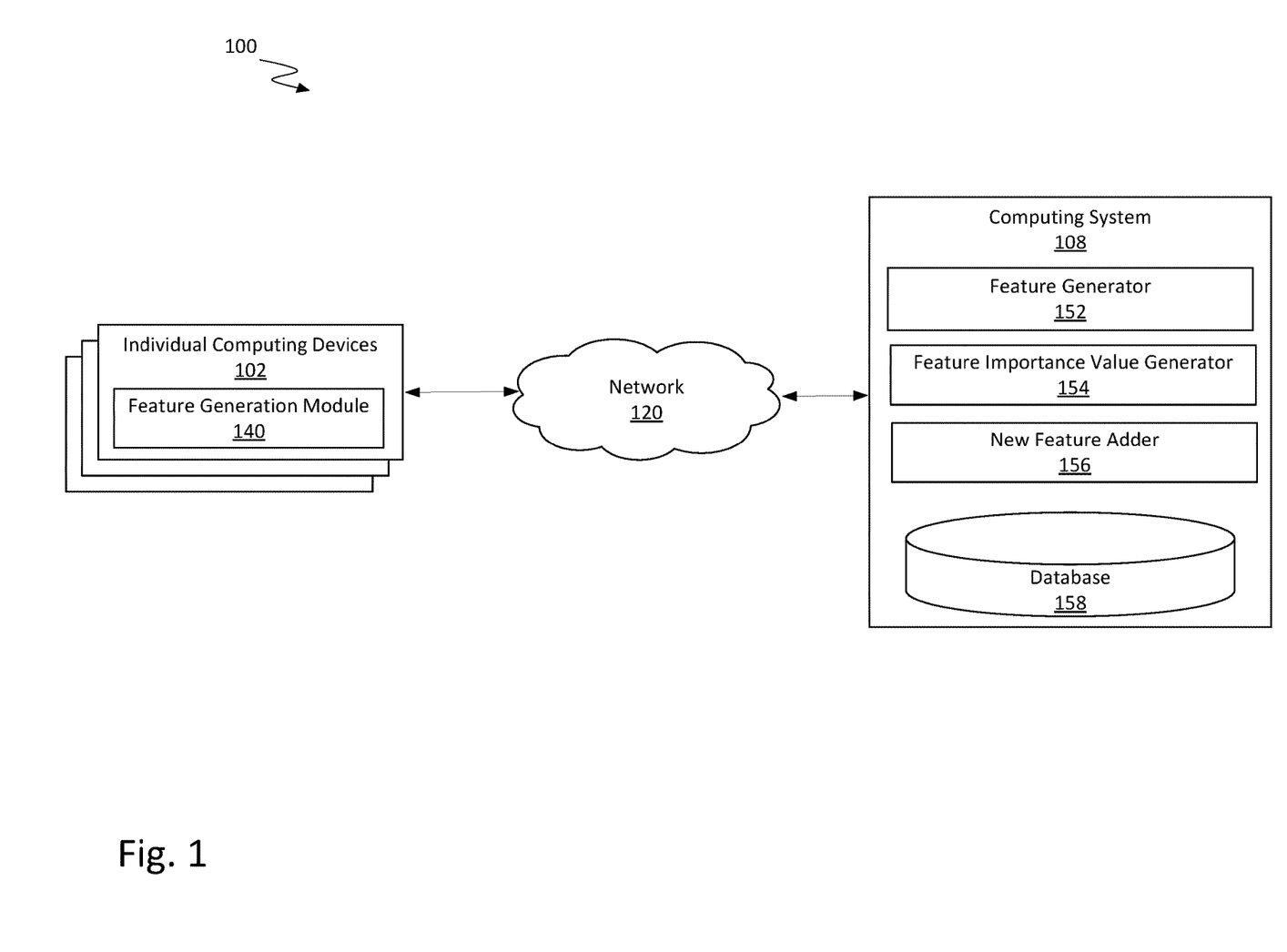
FIG. 1 depicts an illustrative sequential synthesis and selection for feature engineering processing system that may be used in accordance with one or more illustrative aspects described herein.

Turning to FIG. 1, a system 100 is depicted that may include one or more individual computing devices 102, a computing system 108, and a network 120. The one or more individual computing devices 102 and the computing system 108, 104 may be communicatively connected to each other through the network 120. The network 120 may include the Internet, inclusive of the mobile Internet, as well as alternately or in addition a LAN (local area network), a WAN (wide area network), telephone network (Public Switched Telephone Network (PSTN), Session Initiation Protocol (SIP), wireless network, point-to-point network, star network, token ring network, hub network, via protocols such as EDGE, 3G, 4G LTE, Wi-Fi, 5G and WiMAX. Additionally, a variety of authorization and authentication techniques, such as username/password, Open Authorization (OAuth), Kerberos, SecureID, digital certificates, and more, may be used to secure the communications. It will be appreciated that the network connections shown in the system 100 are illustrative, and any means of establishing a communications link between the components, devices, or systems may be used. The data transferred to and from various components, devices, or systems in the system 100 may include secure and sensitive data, such as confidential documents, customer personally identifiable information, and account data. Therefore, it may be desirable to protect the transmissions of such data using secure network protocols and encryption, and/or to protect the integrity of the data when stored on the various devices.

The one or more individual computing devices 102 may be one or more devices, such as a cellular phone, a mobile phone, a smart phone, a tablet, a laptop, or a computing device, like a desktop computer, laptop computer, or, alternatively, a virtual computer. The one or more individual computing devices 102 may be configured to provide a user access to various applications and services. For example, one of the one or more individual computing devices 102 may provide a user with access to the Internet. Additionally, one of the one or more individual computing devices 102 may provide a user with one or more applications located thereon. The one or more applications may provide the user with a plurality of tools and access to a variety of services. In some embodiments, the one or more applications may include a feature generation module 140.

In some implementations, the feature generation module 140 may be configured to receive user input to access the functionality of computing system 108 in accessing functions for the sequential synthesis and selection of features using feature engineering. In some implementations, the feature generation module 140 may be configured to send one or more features associated with a dataset associated with a learning model. The feature generation module 140 may be further configured to send a request for the generation of one or more potential features for the dataset. The feature generation module 140 may be further configured to send a threshold level of correlation that may be used to when determining whether to use the generated one or more potential features for the dataset as described later.

Computing system 108 may be a stand-alone server, a corporate server, a server located in a server farm or cloud-computer environment, or a virtual server hosted on hardware capable of supporting a plurality of virtual servers. Computing system 108 may be associated with a financial institution, such as a bank, a brokerage house, an investment firm, an exchange platform or the like. Computing device 108 may include a feature generator 152, a feature importance value generator 154, a new feature adder 156, and/or a database 158. The various components of computing system 108 may be described as configured to perform one or more functions as described herein. The one or more functions may be performed by other components as described in computing system 108 and by a combination of one or more components of computing system 108.

In some implementations, the feature generator 152 may be configured to receive a dataset with one or more existing features. The dataset may be related to a learning model with data labels where features are learned using labeled data. For example, the data set may be a housing dataset where one dimension of the dataset corresponds to many respective houses and another dimension of the dataset is a feature about the house. For example, features for a house dataset may include square footage of the house, square footage of the lot, number of bathrooms, etc.). The feature generator 152 may further be configured to receive an operation. An operation may be a process, a mathematical function, an algorithm, or other operation that can be applied to one or more features of the dataset. As some non-limiting examples, operations may include, squaring of values, linear combinations of feature values, principal component analysis on a subset of features, k-means algorithm applied to a subset of features, application of a threshold to feature values, and the like. In some implementations, more than one operation may be received to be applied. The feature generator 152 may further be configured to generate one or more potential features by applying one or more received operations. In some implementations, applying the operation may produce many potential features that may not otherwise be considered or investigate. If more than one operation is received, each operation may be applying to generate one or more potential features related to the operation. The feature generator 152 may further be configured to determine if one or more of the potential features are finished generating. In some implementations, the determination that features are finished generating are when the received one or more operations have been applied to all applicable features of the dataset. In some implementations, a limit of new potential features has been received and only that number of new potential features is generated. The feature generator 152 may further be configured to store the one or more generated potential features. In some implementations, each one or more potential features may be stored before the next one is generated.

In some implementations, the feature importance value generator 154 may be configured to receive one or more features associated with a dataset. The feature importance value generator 154 may further be configured to apply a feature importance algorithm to one of the one or more potential features. In some implementations, a feature importance algorithm is able to determine the effect the feature may have on the learning model to predict a desired result of the learning model. In other words, a feature importance algorithm may be able to quantify how useful a feature is in predicting an outcome. The feature importance value generator 154 may further be configured to generate a feature importance value for the respective feature by using a feature importance algorithm. In some implementations, a higher score or, in other words, a higher feature importance value, means the feature will have a larger effect on the learning model. For example, in a housing dataset where the desired predicted outcome is to determine the value of the house, a feature importance value may be generated for each feature (e.g., square footage of the house, square footage of the lot, number of bathrooms, etc.) to quantify how useful a respective feature is in predicting the value of the house. The feature importance value generator 154 may further be configured to generate a respective feature importance value for each of one or more existing features. In some implementations, not only are the feature importance values of the potential feature needed, but also the feature importance values for each of the one or more existing features. In some implementations, the same feature importance algorithm is used on the one or more existing features as is used on the potential feature. In some implementations, the feature importance values for each of the one or more existing features are calculated by also including the prospective feature in the algorithm. It may be necessary to correct for bias when one feature may be too closely correlated to another. The feature importance value generator 154 may further be configured to store the generated feature importance values. In some implementations, the generated feature importance values of the one or more existing features are stored in a matter correlated with the potential feature used as part of the algorithm to generate them. Adding new features may be based on levels of correlation to existing features. In some implementations, new features may only be added when they are not highly correlated with existing features.

The new feature adder 156 may be configured to receive one or more potential features and their respective feature importance values. The new feature adder 156 may further be configured to receive a threshold level of correlation. The threshold level of correlation may be a value associated how closely correlated two features of a respective dataset are to each other. Correlation may mean how similarly the two features may affect the desired prediction of the learning model. The new feature adder 156 may further be configured to sort the features by their respective importance value. In some implementations, the features are sorted such that the highest importance values are acted upon first. The new feature adder 156 may further be configured to iterate through the sorted list starting at the first element. In some implementations, the first element will be associated with a feature that has the highest importance value. The new feature adder 156 may further be configured to determine a level of correlation of the current feature in the list to each of one or more existing features. In other words, the respective feature at the respective location in the sorted list has a level of correlation of the respective feature to each of the one or more existing features. A level may be determined such that the current feature in the list will have a value associated that shows how similarly the current feature in the list may affect the desired prediction of the learning model as each of the one or more existing features. If the level of correlation to all the existing features is under the received threshold level, then the new feature adder 156 may further be configured to add the respective feature as a new feature of the one or more existing features as it has been shown not to be highly correlated with any of the existing features. In other words, if all the level of correlations to each of the existing features is under the level of correlation threshold level, then the respective new feature is added as a new feature. If the respective new feature is too similar (is at or above the threshold level of correlation to one of the existing features), then the feature is not added as a new feature to the one or more existing features. The new feature adder 156 may further be configured to move on to the next item in the sorted list to iterate the next item and go through the process again to determine the level of correlation to each of the existing features for the prospective feature associated with that next item.

The database 158 may be configured to store information related to new feature generation. The database 158 may be configured to store a dataset related to a learning model. The database 158 may be configured to store one or more potential features generated from the dataset. Database 158 may include, but is not limited to relational databases, hierarchical databases, distributed databases, in-memory databases, flat file databases, XML databases, NoSQL databases, graph databases, and/or a combination thereof.

Figure 2:
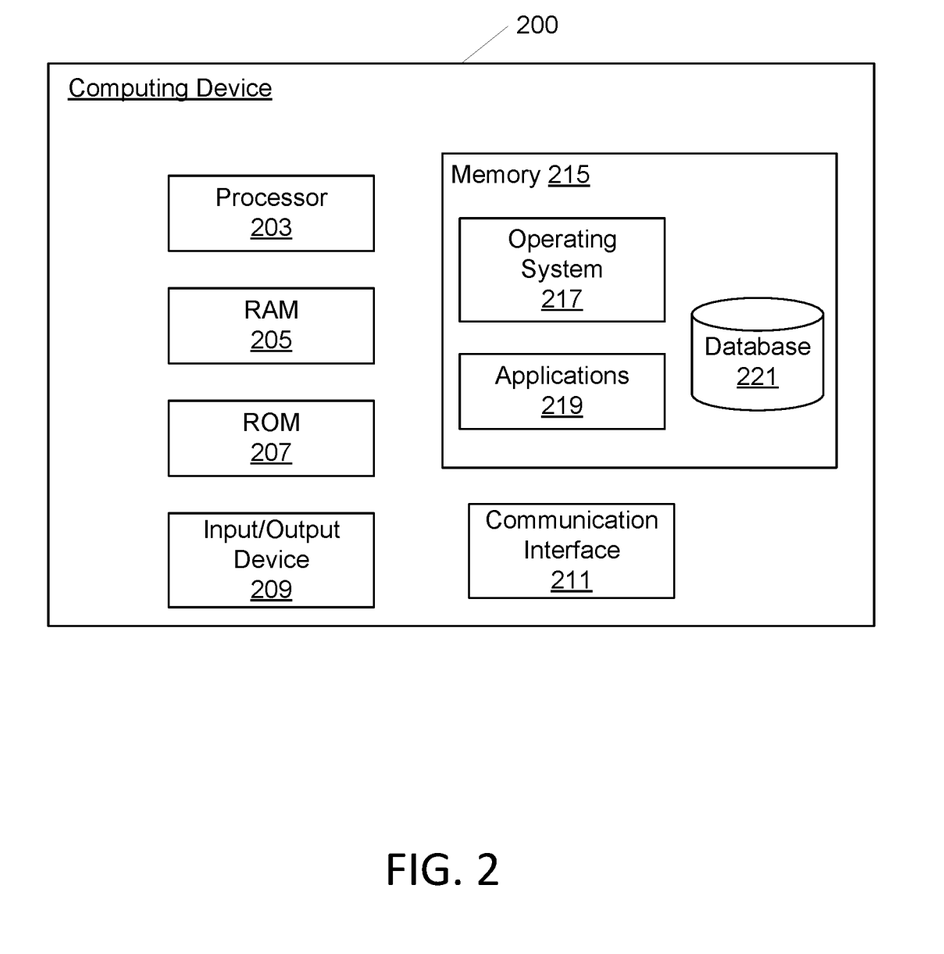
FIG. 2 depicts an illustrative computing system architecture that may be used in accordance with one or more illustrative aspects described herein.

Turning now to FIG. 2, a computing device 200 that may be used with one or more of the computational systems is described. The computing device 200 may include a processor 203 for controlling the overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203, allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, the functionality of the various components may be combined and/or performed by a single component and/or multiple computing devices in communication without departing from the invention.

Figure 3:
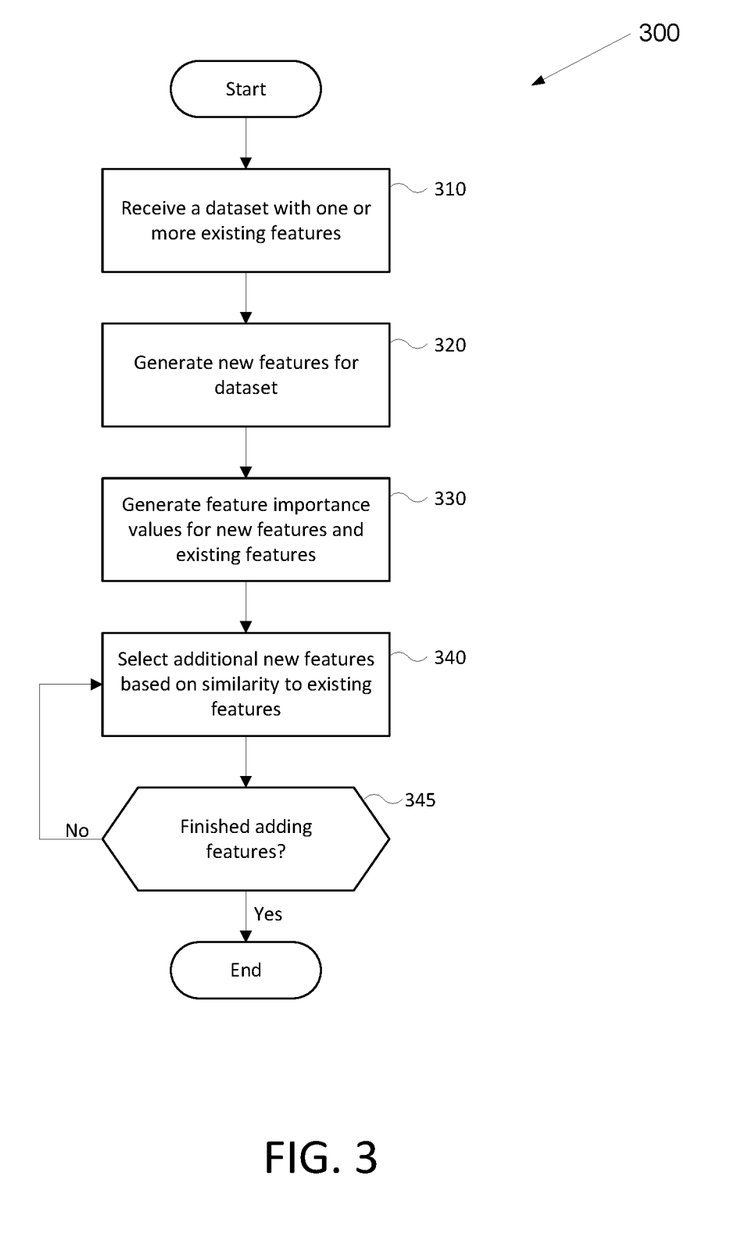
FIG. 3 depicts a flowchart showing an example method for generating potential features for a learning model for use in some implementations.

Methods and Algorithms Related to the Sequential Synthesis and Selection for Feature Engineering A set number of new and useful features for a learning model may be generated with a programmed computer device given a dataset with one or more existing features and an operation that may be applied to the dataset. FIG. 3 depicts a process 300 showing an example method or algorithm for generating potential features for a learning model for use in some implementations. The method or algorithm may be used in some implementations as described herein. The method may be implemented or performed, for example, by one or more of the systems as discussed in connection with FIGS. 1 and 2. The method may be implemented or performed, for example, by one or more computing systems 108. In some embodiments, the actions in the flowchart may be performed in a different order and with different, fewer, or additional actions than those illustrated in FIG. 3. Actions may be combined and/or divided into sub-actions in some implementations.

Process 300 begins in step 310, where a computing device (e.g., the computing system 108) may receive a dataset with one or more existing features. The dataset may be related to a learning model with data labels where features are learned using labeled data. For example, the data set may be a housing dataset where one dimension of the dataset corresponds to many respective houses and another dimension of the dataset is a feature about the house. For example, features for a house dataset may include square footage of the house, square footage of the lot, number of bathrooms, etc.).

In step 320, the computing device may generate new features for the dataset. In some implementations, new features may be generated by applying one or more operations to the existing features of the dataset. An operation may be a process, a mathematical function, an algorithm, or other operation that can be applied to one or more features of the dataset. As some non-limiting examples, operations may include, squaring of values, linear combinations of feature values, principal component analysis on a subset of features, k-means algorithm applied to a subset of features, application of a threshold to feature values, and the like. In some implementations, more than one operation may be received to be applied. In some implementations, applying the operation(s) may produce many potential features that may not otherwise be considered or investigated. In some implementations, the computing device may have to determine if the one or more potential features are finished generating. The determination that features are finished generating may be when the received one or more operations have been applied to all applicable features of the dataset. In some implementations, a limit of new potential features has been received and only that number of new potential features is generated. An embodiment of an example method to generate new features is further described in relation to FIG. 4.

In step 330, the computing device may generate feature importance values for the generated new features and the existing features of the dataset. In some implementations, the computing device may apply a feature importance algorithm to one of the one or more potential features. A feature importance algorithm may be able to determine the effect the feature may have on the learning model to predict a desired result of the learning model. In other words, a feature importance algorithm may be able to quantify how useful a feature is in predicting an outcome. The computing device may use the feature importance algorithm to generate a feature importance value for the respective feature. In some implementations, a higher score or, in other words, a higher feature importance value, means the feature will have a larger effect on the learning model. For example, in a housing dataset where the desired predicted outcome is to determine the value of the house, a feature importance value may be generated for each feature (e.g., square footage of the house, square footage of the lot, number of bathrooms, etc.) to quantify how useful a respective feature is in predicting the value of the house. In addition, the computing device may generate a respective feature importance value for each of one or more existing features. In some implementations, not only are the feature importance values of the potential feature needed, but also the feature importance values for each of the one or more existing features. In some implementations, the same feature importance algorithm is used on the one or more existing features as is used on the potential feature. In some implementations, the feature importance values for each of the one or more existing features are calculated by also including the prospective feature in the algorithm. An embodiment of an example method to generate feature importance values is further described in relation to FIG. 5.

In step 340, the computing device may select additional new features of the generated new features based on a similarity to existing features. The computing device may receive a threshold level of correlation. The threshold level of correlation may be a value associated how closely correlated two features of a respective dataset are to each other. Correlation may mean how similarly the two features may affect the desired prediction of the learning model. The computing device may sort the features by their respective importance value. In some implementations, the features are sorted such that the highest importance values are acted upon first. The computing device may iterate through the sorted list starting at the first element. In some implementations, the first element will be associated with a feature that has the highest importance value. The computing device may determine a level of correlation of the current feature in the list to each of one or more existing features. In other words, the respective feature at the respective location in the sorted list has a level of correlation of the respective feature to each of the one or more existing features. A level may be determined such that the current feature in the list will have a value associated that shows how similarly the current feature in the list may affect the desired prediction of the learning model as each of the one or more existing features. If the level of correlation to all the existing features is under the received threshold level, then the computing device may add the respective feature as a new feature of the one or more existing features as it has been shown not to be highly correlated with any of the existing features. In other words, if all the level of correlations to each of the existing features is under the level of correlation threshold level, then the respective new feature is added as a new feature. If the respective new feature is too similar (is at or above the threshold level of correlation to one of the existing features), then the feature is not added as a new feature to the one or more existing features. The computing device may move on to the next item in the sorted list to iterate the next item and determine the level of correlation to each of the existing features. An embodiment of an example method to select additional features is further described in FIG. 6.

In step 345, the computing device may determine if it is finished adding new features. In some implementations, there may be a requested set maximum number of features that is met. In some implementations, there is not a set number, and all the features that meet the dissimilarity requirements to be added are added to the learning model until all potential features have been iterated through. If the computing device is finished adding new features to the learning model (345:YES), the process may end. If the computing device is not finished adding new features to the learning model (345:NO), the process may return to step 340.

Potential features for a learning model may be generated automatically given a dataset with one or more existing features and an operation that may be applied to the dataset.

Figure 4:
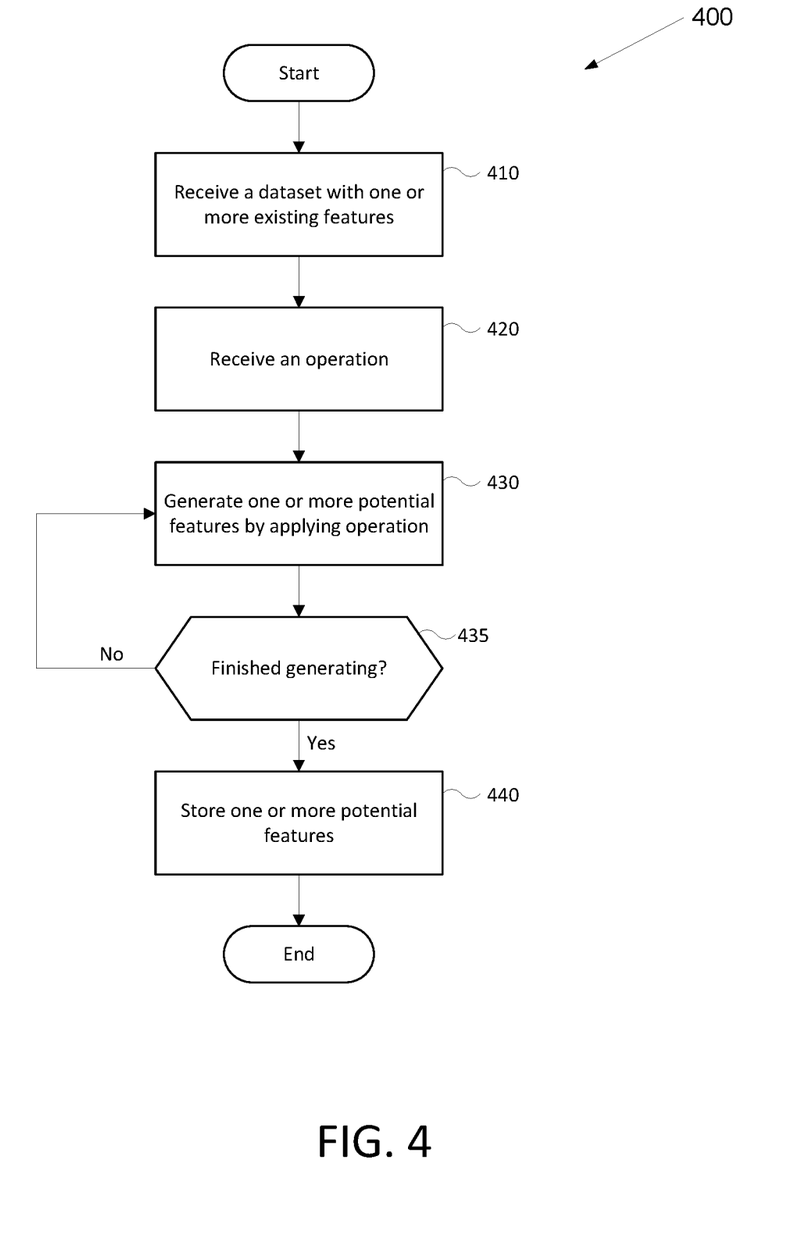
FIG. 4 depicts a flowchart showing an example method for generating feature importance values for potential features for use in some implementations.

FIG. 4 depicts a process 400 showing an example method or algorithm for generating potential features for a learning model for use in some implementations. The method or algorithm may be used in some implementations as described herein. The method may be implemented or performed, for example, by one or more of the systems as discussed in connection with FIGS. 1 and 2. The method may be implemented or performed, for example, by one or more computing systems 108. The method may be implemented or performed, for example, by one or more feature generator(s) 152. In some embodiments, the actions in the flowchart may be performed in a different order and with different, fewer, or additional actions than those illustrated in FIG. 3. Actions may be combined and/or divided into sub-actions in some implementations.

Process 400 may begin in step 410, where a computing device (e.g., the computing system 108) may receive a dataset with one or more existing features. The dataset may be related to a learning model with data labels where features are learned using labeled data. For example, the data set may be a housing dataset where one dimension of the dataset corresponds to many respective houses and another dimension of the dataset is a feature about the house. For example, features for a house dataset may include square footage of the house, square footage of the lot, number of bathrooms, etc.).

In step 420, the computing device may receive an operation. An operation may be a process, a mathematical function, an algorithm, or other operation that can be applied to one or more features of the dataset. As some non-limiting examples, operations may include, squaring of values, linear combinations of feature values, principal component analysis on a subset of features, k-means algorithm applied to a subset of features, application of a threshold to feature values, and the like. In some implementations, more than one operation may be received to be applied.

In step 430, the computing device may generate one or more potential features by applying one or more received operations. In some implementations, applying the operation may produce many potential features that may not otherwise be considered or investigate. If more than one operation is received in step 420, each operation may be applying to generate one or more potential features related to the operation.

In step 435, the computing device may determine if one or more of the potential features are finished generating. In some implementations, the determination that features are finished generating are when the received one or more operations have been applied to all applicable features of the dataset. In some implementations, a limit of new potential features has been received and only that number of new potential features is generated. If the one or more potential features are not finished generating, (435:NO), the process may return to step 430 to generate another potential feature by applying the operation(s).

However, if the determination is that the one or more potential features are finished generating (435:YES), the computing device may store the one or more potential features at step 340. In some implementations, each one or more potential features are stored before the next one is generated.

Figure 5:
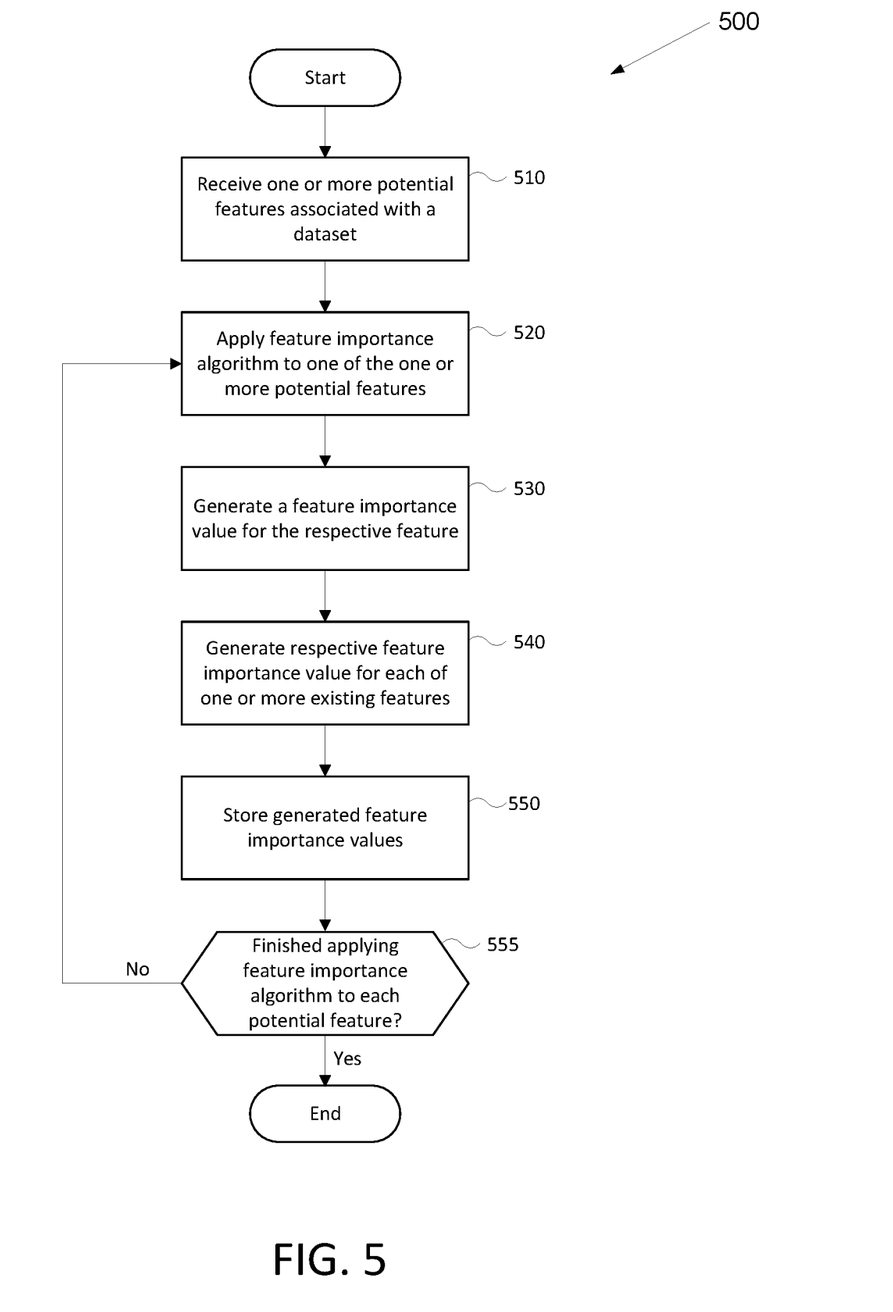
FIG. 5 depicts a flowchart showing an example method for processing a request to digitally sign a transaction for use in some implementations.

Feature importance values may be generated for one or more potential features that are associated with a dataset. FIG. 5 depicts a process 500 showing an example method or algorithm for generating feature importance values for potential features. The method or algorithm may be used in some implementations as described herein. The method may be implemented or performed, for example, by one or more of the systems as discussed in connection with FIGS. 1 and 2. The method may be implemented or performed, for example, by one or more computing systems 108. The method may be implemented or performed, for example, by one or more feature importance value generator(s) 154. In some embodiments, the actions in the flowchart may be performed in a different order and with different, fewer, or additional actions than those illustrated in FIG. 5. Actions may be combined and/or divided into sub-actions in some implementations.

Process 500 begins in step 510, where a computing device may receive one or more features associated with a dataset. In some implementations, the one or more features may have been generated as described in FIG. 4. The dataset and/or the one or more potential features request may be sent by an individual computing device 102 to a computing system 108. In some implementations, the computing system 108 may retrieve the dataset and/or the one or more potential features from computer data storage such as a database (e.g., database 158).

In step 520, the computing device may apply a feature importance algorithm to one of the one or more potential features. In some implementations, a feature importance algorithm is able to determine the effect the feature may have on the learning model to predict a desired result of the learning model. In other words, a feature importance algorithm may be able to quantify how useful a feature is in predicting an outcome. In step 530, the computing device may generate a feature importance value for the respective feature by using a feature importance algorithm. In some implementations, a higher score or, in other words, a higher feature importance value, means the feature will have a larger effect on the learning model. For example, in a housing dataset where the desired predicted outcome is to determine the value of the house, a feature importance value may be generated for each feature (e.g., square footage of the house, square footage of the lot, number of bathrooms, etc.) to quantify how useful a respective feature is in predicting the value of the house.

In step 540, the computing device may generate a respective feature importance value for each of one or more existing features. In some implementations, not only are the feature importance values of the potential feature needed, but also the feature importance values for each of the one or more existing features. In some implementations, the same feature importance algorithm is used on the one or more existing features as is used on the potential feature. In some implementations, the feature importance values for each of the one or more existing features are calculated by also including the prospective feature in the algorithm. It may be necessary to correct for bias when one feature may be too closely correlated to another. This is discussed more in relation to FIG. 6, where only features that do not have a high correlation to existing features are kept.

In step 550, the computing device may store the generated feature importance values. In some implementations, the generated feature importance values of the one or more existing features are stored in a matter correlated with the potential feature used as part of the algorithm to generate them.

In step 555, the computing device may determine if there any additional features to which to apply a feature importance algorithm. If there are no more features to which to apply a feature importance algorithm (555:NO), then the process 500 may end. However, if there are still additional features to which to apply a feature importance algorithm (555:YES), the computing device may return to step 520.

Figure 6:
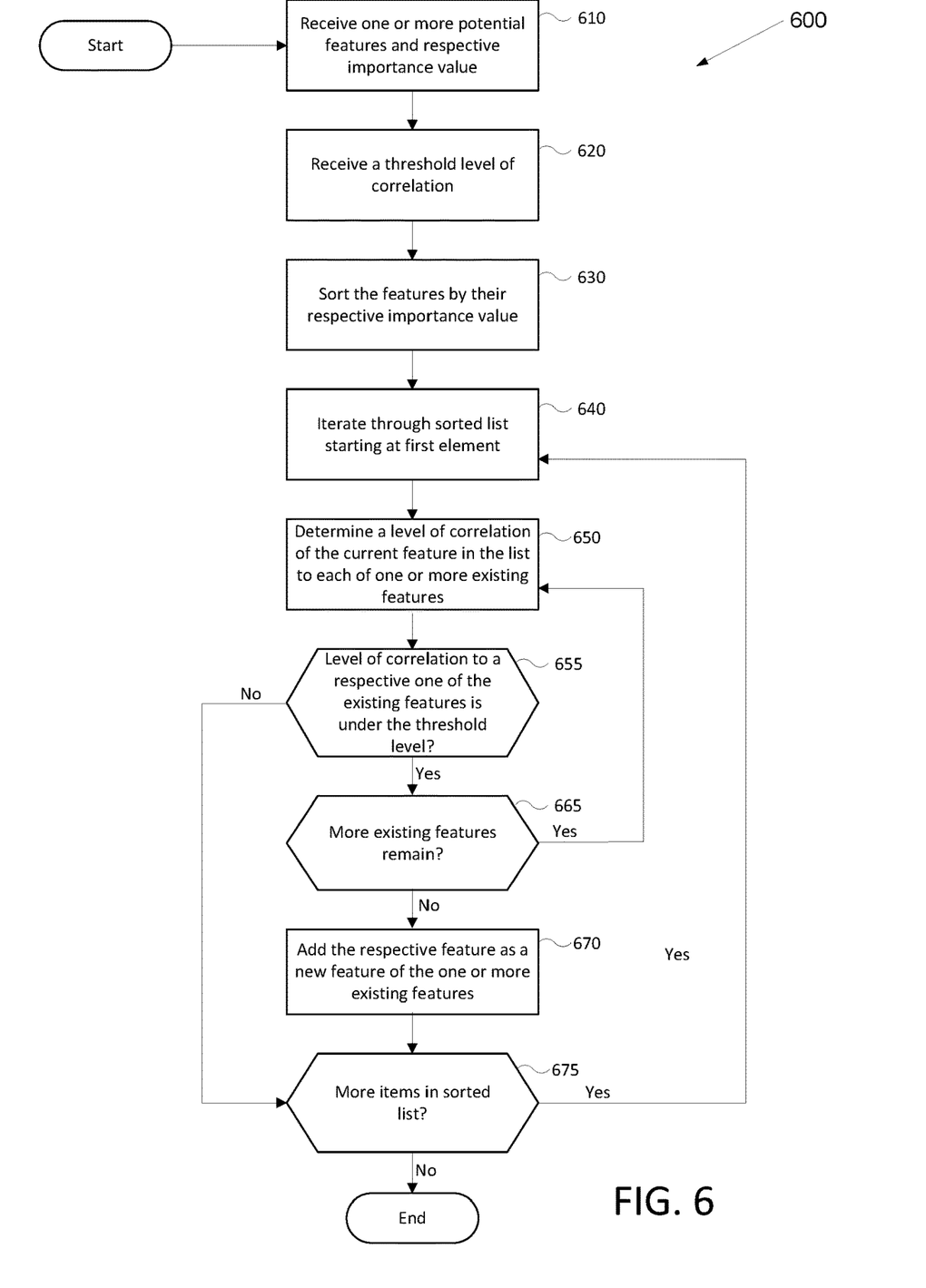
FIG. 6 depicts a flowchart showing an example method for digitally signing a transaction for use in some implementations.

Adding new features may be based on levels of correlation to existing features. In some implementations, new features may only be added when they are not highly correlated with existing features. FIG. 6 depicts a process 600 showing an example method or algorithm for adding new features based on levels of correlation to existing features. The method or algorithm may be used in some implementations as described herein. The method may be implemented or performed, for example, by one or more of the systems as discussed in connection with FIGS. 1 and 2. The method may be implemented or performed, for example, by one or more computing systems 108. The method may be implemented or performed, for example by one or more new feature adder(s) 156. In some embodiments, the actions in the flowchart may be performed in a different order and with different, fewer, or additional actions than those illustrated in FIG. 5. Actions may be combined and/or divided into sub-actions in some implementations.

Process 600 begins in step 610, where a computing device may receive one or more potential features and their respective feature importance values. In some implementations, the one or more potential features may have been generated as described in FIG. 4. In some implementations, the respective feature importance values may have been generated as described in FIG. 5. The dataset and/or the one or more potential features request may be sent by an individual computing device 102 to a computing system 108. In some implementations, the computing system 108 may retrieve the dataset and/or the one or more potential features from computer data storage such as a database (e.g., database 158).

In step 620, the computing device may receive a threshold level of correlation. The threshold level of correlation may be a value associated how closely correlated two features of a respective dataset are to each other. Correlation may mean how similarly the two features may affect the desired prediction of the learning model. In some implementations, the threshold level of correlation may be sent by an individual computing device 102 to a computing system 108. In some implementations, the computing system 108 may retrieve the dataset and/or the one or more potential features from computer data storage such as a database (e.g., database 158).

In step 630, the computing device may sort the features by their respective importance value. In some implementations, the features are sorted such that the highest importance values are acted upon first.

In step 640, the computing device may iterate through the sorted list starting at the first element. In some implementations, the first element will be associated with a feature that has the highest importance value. In step 650, the computing device may determine a level of correlation of the current feature in the list to each of one or more existing features. In other words, the respective feature at the respective location in the sorted list has a level of correlation of the respective feature to each of the one or more existing features. In other words, a level is determined such that the current feature in the list will have a value associated that shows how similarly the current feature in the list may affect the desired prediction of the learning model as each of the one or more existing features.

In step 655, the computing device may determine if the level of correlation to a respective one of the existing features is under the threshold level. If the level of correlation to a respective one of the existing features is under the threshold level (655:YES), the computing device may go to step 665 and determine if there are more existing features that remain. If there are more existing features that remain (665:YES), then the computing device may return to step 650 to determine a level of correlation of the current feature in the list to the next existing feature. If there are no more existing features that remain (665:NO), then the computing device may go to step 670 to add the respective feature as a new feature of the one or more existing features. In other words, if all the level of correlations to each of the existing features is under the level of correlation threshold level, then the respective new feature is added as a new feature. If the respective new feature is too similar (is at or above the threshold level of correlation to one of the existing features), then the feature is not added as a new feature to the one or more existing features.

If any of the levels of correlation to a respective one of the existing features is at or above the threshold level (665: NO), then the computing device may go to step 675 to determine if there are more items in the sorted list. If there are no more items in the sorted list (675:NO), then the process may end. If there are items in the sorted list (675:YES), then the process may return to step 650 to iterate to the next item in the sorted list. In other words, each item in the sorted list is checked for a level of correlation to each of one or more existing features and only those features in the sorted list that are not highly correlated to one of the existing features is added as a new feature to the number of existing features. In some implementations, the process may end prematurely if there is a maximum number of new features to be added. For example, if there is a request to only add five new features to the number of existing features, then the process may end once five new features are added even if there are still additional items left in the sorted list.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any appropriate scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, executing on a computing device, comprising:
   receiving a dataset with one or more existing features, wherein the received dataset is associated with a dataset label defining a machine-learning target attribute;
   receiving an operation that can be applied to at least one of the one or more existing features of the dataset;
   generating one or more potential features by applying the operation to the at least one of the one or more existing features;
   for each of the one or more potential features:
      applying a feature importance algorithm to the respective feature along with the one or more existing features, and
      generating a respective feature importance value for the respective feature based on applying the feature importance algorithm;
      generating respective feature importance values for each of the one or more existing features based on applying the feature importance algorithm; and
      updating, based on applying the feature importance algorithm, the respective feature importance value for the respective feature by:
         summing the respective feature importance values for the one or more existing features, and
         dividing by the respective feature importance value:
   sorting the generated one or more potential features by their respective feature importance values;
   receiving a threshold level of correlation;
   iterating through the sorted, generated one or more potential features until a total number of new features are added or until no more potential features are left by, for a given potential feature:
      determining one or more correlations between the given potential feature and each of the one or more existing features; and
      adding, based on determining that each of the one or more correlations is under the threshold level of correlation, the given potential feature to the dataset as a new feature; and
   training, using the dataset, a machine learning model.

2. The method of claim 1, further comprising:
   skipping adding a second feature of the sorted, generated one or more potential features to the dataset based on determining that a correlation between the second feature and at least one of the one or more existing features is at or over the threshold level of correlation.

3. The method of claim 1, wherein for each of the one or more potential features:
   a plurality of respective feature importance values for the respective feature are obtained based on applying the feature importance algorithm a plurality of times,
   a plurality of respective feature importance values for each of the one or more existing features are obtained based on applying the feature importance algorithm the plurality of times,
   the respective feature importance value for the respective feature is obtained by averaging the plurality of respective feature importance values for the respective feature, and
   the respective feature importance values for the one or more existing features is obtained by averaging the plurality of respective feature importance values for each respective one or more existing features.

4. The method of claim 1, wherein an added first feature of the dataset is used as an input to the trained machine-learning model.

5. The method of claim 1, further comprising:
   receiving a number of runs to perform; and
   wherein for each of the one or more potential features:
      the number of runs to perform of respective feature importance values for the respective feature are obtained based on applying the feature importance algorithm the number of runs to perform times,
      the number of runs to perform of respective feature importance values for each of the one or more existing features are obtained based on applying the feature importance algorithm the number of runs to perform times,
      the respective feature importance value for the respective feature is obtained by averaging the number of runs to perform of respective feature importance values for the respective feature, and
      the respective feature importance values for the one or more existing features is obtained by averaging the number of runs to perform of respective feature importance values for each respective one or more existing features.

6. The method of claim 1, further comprising:
   receiving an indication of the total number of new features to add.

7. The method of claim 6 further comprising:
   sending an alert based on determining the number of new features added consequent to iterating through the sorted, generated one or more potential features is less than the total number of new features.

8. A computing system comprising:
   one or more processors; and
   memory storing instructions that, when executed by the one or more processors, cause the computing system to:
      receive a dataset with one or more existing features, wherein the received dataset is associated with a dataset label defining a machine-learning target attribute;
      receive an operation that can be applied to at least one of the one or more existing features of the dataset;
      generate one or more potential features by applying the operation to the at least one of the one or more existing features;
      for each of the one or more potential features:
         apply a feature importance algorithm to the respective feature along with the one or more existing features,
         generate a respective feature importance value for the respective feature based on applying the feature importance algorithm, and
         generate respective feature importance values for each of the one or more existing features based on applying the feature importance algorithm;

sort the generated one or more potential features by their respective feature importance values;
receive a threshold level of correlation;
iterate through the sorted, generated one or more potential features until a total number of new features are added or until no more potential features are left by, for a given potential feature:
determining one or more correlations between the given potential feature and each of the one or more existing features; and
adding, based on determining that each of the one or more correlations is under the threshold level of correlation, the given potential feature to the dataset as a new feature; and
train, using the dataset, a machine learning model, wherein an added first feature of the dataset is used as an input to the trained machine-learning model.

9. The computing system of claim 8, wherein the memory is further storing instructions that, when executed by the one or more processors, cause the computing system to:
skip adding a second feature of the sorted, generated one or more potential features to the dataset based on determining that a correlation between the second feature and at least one of the one or more existing features is at or over the threshold level of correlation.

10. The computing system of claim 8, wherein for each of the one or more potential features:
a plurality of respective feature importance values for the respective feature are obtained based on applying the feature importance algorithm a plurality of times,
a plurality of respective feature importance values for each of the one or more existing features are obtained based on applying the feature importance algorithm the plurality of times,
the respective feature importance value for the respective feature is obtained by averaging the plurality of respective feature importance values for the respective feature, and
the respective feature importance values for the one or more existing features is obtained by averaging the plurality of respective feature importance values for each respective one or more existing features.

11. The computing system of claim 8, wherein the memory is further storing instructions that, when executed by the one or more processors, cause the computing system to update the respective feature importance value for the respective feature based on applying the feature importance algorithm by summing the respective feature importance values for the one or more existing features and dividing by the respective feature importance value.

12. The computing system of claim 8, wherein the memory is further storing instructions that, when executed by the one or more processors, cause the computing system to:
receive a number of runs to perform; and
wherein for each of the one or more potential features:
the number of runs to perform of respective feature importance values for the respective feature are obtained based on applying the feature importance algorithm the number of runs to perform times,
the number of runs to perform of respective feature importance values for each of the one or more existing features are obtained based on applying the feature importance algorithm the number of runs to perform times,
the respective feature importance value for the respective feature is obtained by averaging the number of runs to perform of respective feature importance values for the respective feature, and
the respective feature importance values for the one or more existing features is obtained by averaging the number of runs to perform of respective feature importance values for each respective one or more existing features.

13. The computing system of claim 8, wherein the memory is further storing instructions that, when executed by the one or more processors, cause the computing system to:
receive the total number of new features to add.

14. The computing system of claim 13, wherein the memory is further storing instructions that, when executed by the one or more processors, cause the computing system to:
send an alert based on determining the number of new features added consequent to iterating through the sorted, generated one or more potential features is less than the total number of new features.

15. A non-transitory computer-readable storage medium comprising instructions that, when executed, cause a computing system to:
receive a dataset with one or more existing features, wherein the received dataset is associated with a dataset label defining a machine-learning target attribute;
receive an operation that can be applied to at least one of the one or more existing features of the dataset;
generate one or more potential features by applying the operation to the at least one of the one or more existing features;
for each of the one or more potential features:
apply a feature importance algorithm to the respective feature along with the one or more existing features;
generate a respective feature importance value for the respective feature based on applying the feature importance algorithm; and
generate respective feature importance values for each of the one or more existing features based on applying the feature importance algorithm, and;
update, based on applying the feature importance algorithm, the respective feature importance value for the respective feature by:
summing the respective feature importance values for the one or more existing features, and
dividing by the respective feature importance value:
sort the generated one or more potential features by their respective feature importance values;
receive a threshold level of correlation;
iterate through the sorted, generated one or more potential features until a total number of new features are added or until no more potential features are left by, for a given potential feature:
determine one or more correlations between the given potential feature and each of the one or more existing features;
adding, based on determining that each of the one or more correlations is under the threshold level of correlation, the given potential feature to the dataset as a new feature;
skip adding a second feature of the sorted, generated one or more potential features to the dataset based on determining that a correlation between the second feature and at least one of the one or more existing features is at or over the threshold level of correlation; and
train, using the dataset, a machine learning model.

16. The non-transitory computer-readable storage medium of claim 15, wherein for each of the one or more potential features:
- a plurality of respective feature importance values for the respective feature are obtained based on applying the feature importance algorithm a plurality of times,
- a plurality of respective feature importance values for each of the one or more existing features are obtained based on applying the feature importance algorithm the plurality of times,
- the respective feature importance value for the respective feature is obtained by averaging the plurality of respective feature importance values for the respective feature, and
- the respective feature importance values for the one or more existing features is obtained by averaging the plurality of respective feature importance values for each respective one or more existing features.

17. The non-transitory computer-readable storage medium of claim 15, wherein an added first feature of the dataset is used as an input to the machine-learning model.

\* \* \* \* \*